Jan. 15, 1952     L. J. FORD     2,582,688

CONTACTING TOWER CONSTRUCTION

Filed June 14, 1949     2 SHEETS—SHEET 1

Lloyd J. Ford Inventor
By W. O. T. Heilman Attorney

Jan. 15, 1952     L. J. FORD     2,582,688
CONTACTING TOWER CONSTRUCTION

Filed June 14, 1949     2 SHEETS—SHEET 2

Lloyd J. Ford Inventor
By W. O. T Hilman Attorney

UNITED STATES PATENT OFFICE 2,582,688

CONTACTING TOWER CONSTRUCTION

Lloyd J. Ford, Baton Rouge, La., assignor to Standard Oil Development Company, a corporation of Delaware Application June 14, 1949, Serial No. 98,908

7 Claims. (Cl. 34—57)

The present invention relates to improvements in the construction of fluid contacting towers. More particularly, the invention relates to such improvements in the construction of plate towers for contacting gases with finely divided solid materials by a process in which the finely divided solids are passed downwardly through the tower from plate to plate.

In conventional operations, gases may be contacted with finely divided solid materials in somewhat the same fashion as fluids and liquids in a typical plate tower. In such apparatus, a vertically disposed tower vessel is provided interiorly with a series of vertically spaced transverse plates, the plates being provided with perforations such as to permit fluid or gaseous materials to pass upwardly through the tower through such perforations while liquid or finely divided solid materials of greater density or gravity are permitted to flow downwardly through the tower by way of conduit means normally called downcomers. As a usual feature of such apparatus, weirs are provided adjacent the opening of a downcomer through any plate so as to create a certain head of liquid on each plate, the liquid overflowing the weir and passing downwardly to the next plate below through the downcomer. Where gases are contacted with finely divided solid materials, a similar head of finely divided solids is created by comparable weir elements, the finely divided solids being substantially fluidized by the gaseous materials passing through the plate elements, and in a fluidized condition, the finely divided solids flow from plate to plate downwardly in a manner similar to that of a liquid. Differing, however, from the character of a liquid, the finely divided solid materials have a tendency to become compacted at points where the direction of flow is changed abruptly or where the flowing stream of fluidized solid material is unduly confined. Such conditions have been found to exist in a tower structure of the character contemplated where the downcomer elements form a narrow angled joint with the side walls of the tower or where the discharge end of the downcomer is in close proximity to such side wall.

It is an object of the present invention to provide a downcomer structure in which the discharge flow from the lower end thereof adjacent a plate in the tower is more evenly distributed. It is a further object of the invention to provide a downcomer in which provision is made for increasing the area of flow from the discharge end at points adjacent the tower wall.

The invention and its objects may be more fully understood by reference to the accompanying drawings, in which Figure 1 is a side elevational view in vertical section of a portion of a tower embodying the present invention;

Figure 3:
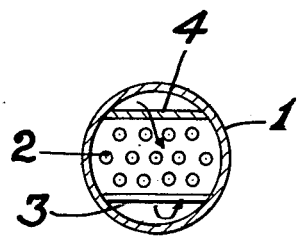
Figure 3 is a cross-sectional view through the tower portion according to Figure 1 along the line III—III thereof.
Figure 2:
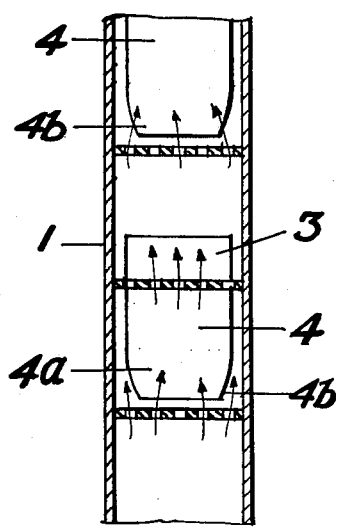
Figure 2 is a vertical section through the tower portion according to Figure 1 along the line II—II thereof.
Figure 1:
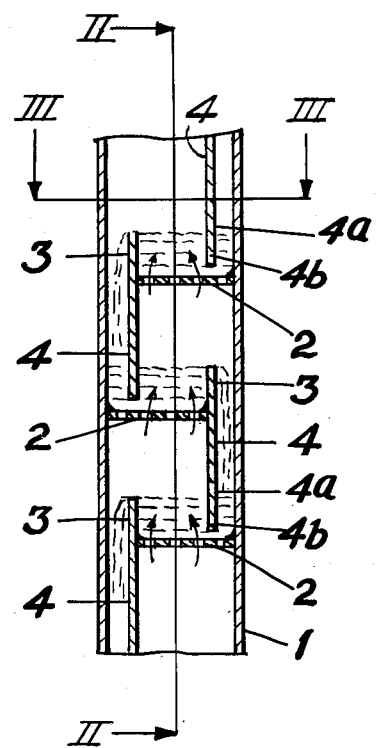

Referring more specifically to the drawings, the Figures 1, 2 and 3 illustrate a tower structure of generally conventional form in which a tower 1 is provided with a series of vertically spaced transverse plate elements 2, each plate having an omitted segmental portion providing a downcomer opening for communication from plate to plate downwardly through the tower. Normally, the plates 2 will be perforated to provide for the passage of a gaseous material upwardly through the tower and such perforations may or may not be provided with bubble cap elements. The showing of bubble cap elements in the drawings has been omitted. In the apparatus illustrated, the inner edge of each segmental opening in each plate is provided with a vertical weir 3 and a downcomer element 4. As shown, the downcomer 4 and the weir 3 are integral in a substantially flat plate disposed along a chord of the tower formed by the inner edge of the segmental transverse plate opening, the downcomer portion extending downwardly from one plate into vertically spaced relation to the surface of the plate next below and providing a conduit for the flow of finely divided solid materials from plate to plate. The lateral edges of the downcomer and weir portions of the plate are secured to the tower wall as by welding or bolted clips, the plate member forming an interior wall portion of a conduit, with the adjoining tower wall portion to which secured. By means of the weir 3, a head of such materials is established on each plate. Gaseous materials flowing upwardly through the tower are passed through the perforations in each plate, and bell caps, if provided.

Each downcomer 4 extends downwardly from the edge of the segmental opening in one plate into vertically spaced relation to the surface of a plate next below and is provided with a substantially freely dependent lower end portion 4a. This portion 4a is formed by skewed edge portions 4b extending angularly upward from intermediate points on the lower edge of the portion 4a and terminating at a juncture of an intermediate portion of the downcomer with the lower end portion 4a. The skew edge portions 4b also terminate at a level substantially below the upper limit of the weir 3, and face outwardly toward the tower wall. The form and area of the free space provided by means of the skew edge portions on the freely dependent section 4a of the downcomer is adjusted in such fashion that with vertically downward flow of solid particles through the downcomer, there will be substantially no restriction of such flow at approximately the point at which the direction of flow is changed to pass the solid materials horizontally across the plate. Total flow through the free space between portion 4a and the plate 2 may be suitably adjusted to obtain good flow distribution over the plate by suitably proportioning the extent of the area of the opening between the skewed edges and the tower wall to the extent of the remaining area between the lower edge of portion 4a and the plate.

In the operation of a structure according to the present invention, as illustrated and described, it has been found that little, if any, accumulation of solid materials occurs at or adjacent to the juncture of the lateral edges of downcomer 4 with the tower walls. The cutaway portions provided, according to this invention, relieve the normally restricted outflow from the downcomer and prevent compacting of the solid materials at the points normally restricted and also overcome the reduction of the effective flow areas.

Figure 4:
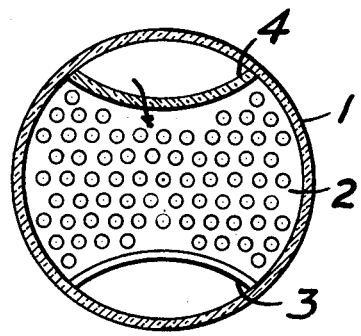
Figure 4 is a cross-sectional view similar to Figure 3 showing an alternate form of downcomer.

Although in Figures 1, 2 and 3, the improved structure has been illustrated with reference to a tower in which the downcomer and weir elements are substantially rectangular plate members disposed as a chord along the inner edge of a segmental opening provided with each plate, various alternate arrangements are possible. In Figure 4, a horizontal section through a similar form of construction is represented, but in this form, the segmental opening is provided with a concave inner edge and the downcomer and weir members are suitably curved to fit the opening. In another form, the segmental opening may have a substantially convex inner edge and the downcomer and weir elements shaped to fit. In either of these two modifications, the lower end portion 4a of the downcomer will be cut away so as to provide skewed lower edge portions similar to those shown by Figure 2.

Figure 5:
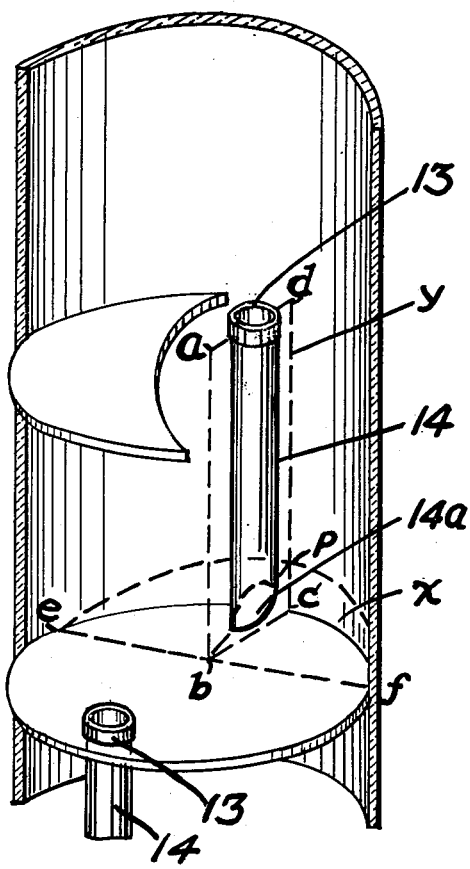
Figure 5 is a perspective view of a portion of a tower cutaway to show a tubular downcomer with relation to the tower structure.

Although the most serious difficulties have been encountered with the use of chord type downcomers, the use of tubular downcomer conduits disposed so as to extend through a transverse plate adjacent the periphery thereof, may also result in an undesirable accumulation of solid materials between the downcomer and the tower wall. To avoid such accumulation, a tubular downcomer may also be modified in substantially the same manner as described with reference to a chord type downcomer. This form of construction is illustrated in Figure 5. As shown, transverse plate 2 in the tower 1 are provided with tubular weir and downcomer elements 13 and 14 which may or may not be formed as an integral unit. The lower end portion 14a of the downcomer 14 is provided with a skewed edge extending angularly upward from vertically spaced relation to the plate below toward the tower wall and lying in an angularly disposed plane $x$ indicated by broken lines, the downcomer and weir elements being centered in a vertical plane $y$, also shown by broken lines, which pass through a line on the tower wall which most closely adjoins the wall of the downcomer and is substantially parallel thereto, the vertical plane $y$ intersecting the angular plane $x$ in a substantially laterally right angular relationship.

Figure 6:
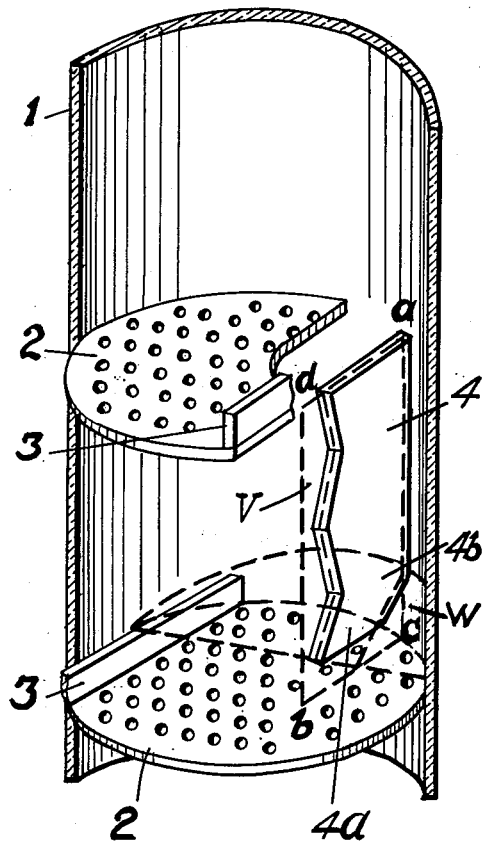
Figure 6 is a similar view showing a chord-type downcomer.

The planar relationship of the tubular downcomer element, as illustrated by Figure 5, is similarly illustrated with reference to a chord-type downcomer by Figure 6. In this figure, the skewed lower edge 4b of the portion 4a lies in the angular plane $w$ and the chord-type downcomer 4 including the portion 4a is centered in a vertical plane $v$ intersecting the tower wall in a vertical line passing through approximately the juncture of a segmental opening in a plate 2 with the tower 1.

What is claimed is:

1. In a walled tower for contacting gases and finely divided solid materials, said tower having a plurality of vertically spaced transverse plate elements, a downcomer comprising a conduit having an inlet and opening into the space above one plate, a conduit wall portion extending downwardly therefrom and a discharge end opening in spaced relation to the surface of the plate next below, a skewed lower edge portion on said discharge end facing angularly toward the nearest tower wall portion, the distance of said edge from the plate next below increasing angularly upwardly in the direction of said nearest tower wall portion, and in upwardly diminished spaced relation to said wall portion.

2. Apparatus according to claim 1, in which said conduit is a tubular member.

3. In a walled tower for contacting gases and finely divided solid materials, said tower having a plurality of vertically spaced transverse plate elements, each plate having a substantially segmental downcomer opening therethrough, with an inner edge on said plate, a chord-type downcomer, comprising a conduit formed between a tower wall portion and an interior wall member having an upper end secured to a plate at a segmental downcomer opening, the conduit opening upwardly therethrough, an intermediate wall portion joined at its lateral edges to said tower walls, with a dependent lower end terminating in vertically spaced relation to a plate next below, and skew edge portions in said lower end extending angularly upward from intermediate points therein and terminating at the juncture of the intermediate wall portion lateral edges with said lower end, said skew edge portions each facing toward a tower wall, in upwardly diminished spaced relation thereto.

4. Apparatus according to claim 3, in which the inner edge of said segmental opening is in a straight line, and said interior wall member is a flat plate.

5. Apparatus according to claim 3, in which the inner edge of said segmental opening is in a concave curved line, and said inner wall member is a laterally curved plate to match said edge.

6. Apparatus according to claim 3, in which the inner edge of said segmental opening is in a convex curved line, and said inner wall member is a laterally curved plate to match said edge.

7. In a walled tower for contacting gases and finely divided solid materials, said tower having a plurality of vertically spaced plate elements, each having a downcomer opening therein, and a weir enclosing said opening, a downcomer comprising a conduit having an inlet end opening into the space above one plate, a conduit wall portion extendind downwardly therefrom and a discharge end opening in spaced relation to the surface of the plate next below, a skewed lower edge portion on said discharge end facing angularly toward the nearest tower wall portion, in upwardly diminished spaced relation thereto, the distance of said edge from the plate next below increasing angularly upwardly in the direction of said nearest tower wall portion, the greatest distance of said edge from the plate being below the height of the weir on said plate next below.

LLOYD J. FORD.

REFERENCES CITED

The following references are of record in the file of this patent:

UNITED STATES PATENTS

| Number | Name | Date |
| --- | --- | --- |
| 1,748,411 | Cooke | Feb. 25, 1930 |
| 2,247,485 | Edmister et al. | July 1, 1941 |
| 2,254,370 | Kaplan | Sept. 2, 1941 |
| 2,320,073 | Gibb | May 25, 1943 |
| 2,367,694 | Snuggs | Jan. 23, 1945 |
| 2,444,990 | Hemminger | July 13, 1948 |